(12) United States Patent
Kuramoto et al.

(10) Patent No.: US 7,800,855 B2
(45) Date of Patent: Sep. 21, 2010

(54) DISK DRIVE AND CALIBRATION METHOD THEREFOR

(75) Inventors: Kenichi Kuramoto, Kanagawa (JP); Shinya Sakamoto, Kanagawa (JP); Nobuhiko Wasa, Kanagawa (JP); Sayaka Nojiri, Kanagawa (JP); Hidefumi Tominaga, Tokyo (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 421 days.

(21) Appl. No.: 11/985,367

(22) Filed: Nov. 14, 2007

(65) Prior Publication Data

US 2008/0123216 A1  May 29, 2008

(30) Foreign Application Priority Data

Nov. 15, 2006 (JP) .............................. 2006-309745

(51) Int. Cl.
 *G11B 5/55* (2006.01)
 *G11B 21/12* (2006.01)
(52) U.S. Cl. .................... 360/75; 360/78.07; 360/78.09
(58) Field of Classification Search ........................ None
See application file for complete search history.

(56) References Cited

U.S. PATENT DOCUMENTS

| | | | |
|---|---|---|---|
| 6,563,660 B1 | 5/2003 | Hirano et al. | |
| 6,760,178 B2 * | 7/2004 | Shibata | 360/75 |
| 6,795,268 B1 * | 9/2004 | Ryan | 360/78.04 |
| 6,917,486 B2 * | 7/2005 | Tanner | 360/75 |
| 7,009,806 B2 * | 3/2006 | Zayas et al. | 360/78.04 |
| 7,042,673 B2 * | 5/2006 | Jeong | 360/75 |
| 7,082,009 B2 * | 7/2006 | Zayas et al. | 360/78.04 |
| 7,164,250 B2 * | 1/2007 | Boscolo et al. | 318/400.42 |
| 7,235,938 B2 * | 6/2007 | Daio | 318/400.34 |
| 7,277,253 B2 * | 10/2007 | Yamashita et al. | 360/75 |
| 7,280,308 B2 * | 10/2007 | Kokami | 360/78.04 |
| 7,375,917 B1 * | 5/2008 | Fujii et al. | 360/78.04 |
| 7,421,359 B2 * | 9/2008 | Harmer et al. | 702/85 |
| 7,468,859 B2 * | 12/2008 | Hansen et al. | 360/78.04 |
| 7,486,039 B2 * | 2/2009 | Berto | 360/75 |
| 7,561,366 B2 * | 7/2009 | Wasa et al. | 360/75 |
| 2005/0237052 A1 * | 10/2005 | Chan | 324/207.11 |
| 2008/0007271 A1 * | 1/2008 | Smith et al. | 324/601 |

FOREIGN PATENT DOCUMENTS

JP              2001 A    12/2001

* cited by examiner

*Primary Examiner*—Hoa T Nguyen
*Assistant Examiner*—James L Habermehl

(57) ABSTRACT

Embodiments of the present invention help to prevent destabilization in voice coil motor (VCM) velocity control. According to one embodiment, a hard disk controller/multiprocessing unit (HDC/MPU) calibrates a correction operational coefficient of a detected back electromotive force (EMF) voltage before unloading. The calibration is carried out in a state that an actuator is pivoting. The HDC/MPU calibrates the correction coefficient according to a motion equation of the actuator using VCM current applied to a VCM and a detected value of a back EMF voltage detection circuit.

14 Claims, 10 Drawing Sheets

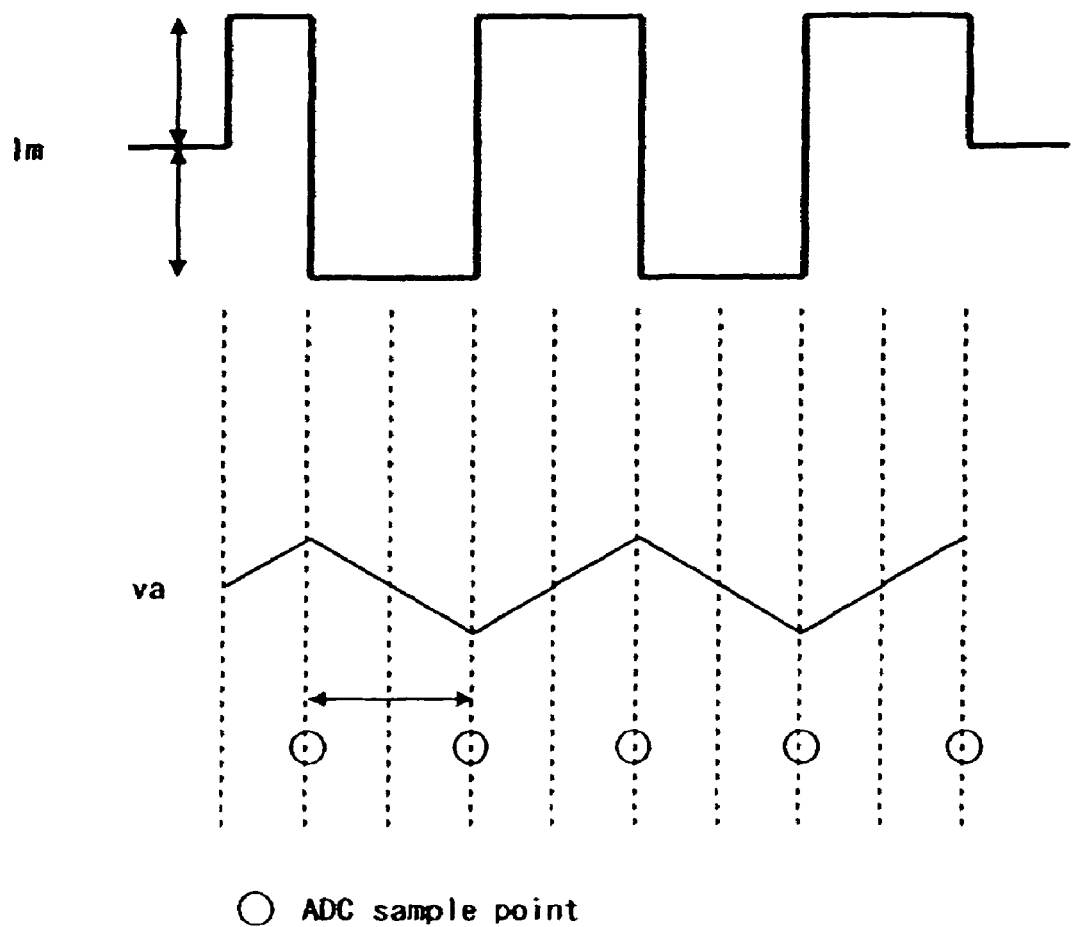

DISK DRIVE AND CALIBRATION METHOD THEREFOR

CROSS-REFERENCE TO RELATED APPLICATION

The instant nonprovisional patent application claims priority to Japanese Patent Application No. 2006-309745 filed Nov. 15, 2006 and which is incorporated by reference in its entirety herein for all purposes.

BACKGROUND OF THE INVENTION

Disk drive devices using various kinds of media, such as an optical disk, a magneto-optical disk, and a flexible magnetic disk, have been known in the art. In particular, a hard disk drive (HDD) has been widely used as a storage device of a computer and has been one of indispensable disk drive devices for current computer systems. Moreover, the HDD has found widespread application such as a removable memory used in a moving image recording/reproducing apparatus, a car navigation system, a cellular phone, or a digital camera, as well as the computer, due to its outstanding characteristics.

A magnetic disk used in the HDD has a plurality of concentric data tracks. On the respective data tracks, a plurality of servo data containing address information and a plurality of data sectors including user data are recorded. A plurality of data sectors are recorded between the respective servo data. A head element portion of a head slider supported by an actuator pivoted by a voice coil motor (VCM) can read and write data to and from the data sector by accessing a desired data sector according to the address information of the servo data.

When the magnetic disk is not rotating, the actuator and the head slider is retracted to a retract position. As a scheme for retracting the head slider, ramp loading/unloading scheme and contact start stop (CSS) scheme are known in the art. During moving between the retract position and over the magnetic disk, the HDD controls pivoting of the actuator by velocity control of the VCM. Since the VCM velocity is proportional to a back electromotive force (EMF) voltage, measuring the back EMF voltage of the VCM enables the velocity control of the VCM. Specifically, the back EMF voltage detection circuit detects the back EMF voltage of the VCM. The controller controls to supply VCM current to the VCM so that the detected back EMF voltage becomes a target value. Typically, the back EMF voltage detection circuit detects the back EMF voltage by detecting a value expressed by a linear function of the back EMF voltage.

When the resistance of the VCM coil varies in accordance with temperature changes, the relationship between the VCM current and the back EMF voltage is changed. Therefore, the back EMF voltage detection circuit compensates changes of the resistance of the VCM coil by changing circuit parameters. However, as a discrete value is applied to the circuit parameter, the changes of the resistance of the VCM coil are sometimes not compensated completely. Also, detection errors occur due to the circuit configuration of the back EMF voltage detection circuit. Hence, the detection value of the back EMF voltage detection circuit contains an offset proportional to the VCM current supplied to the VCM.

Hereafter, the above is specifically explained. FIG. 9 is a circuit diagram showing an example of circuit configurations of the back EMF voltage detection circuit 221. The back EMF voltage detection circuit 221 includes operational amplifiers OP1 and OP2, balance resistors R1, R2, R3$a$, R3$b$, R4$a$, and R4$b$. The resistors R3$a$ and R3$b$ have the same resistance R3, and the resistors R4$a$ and R4$b$ have the same resistance R4. The resistor R2 is a variable resistor and its resistance R2 is the above-described circuit parameter. Further, a sense resistor Rs is connected serially to the VCM coil.

The back EMF voltage β satisfies the following equation:

$$\beta = Vm - Rm \times Im. \quad (1)$$

wherein Vm, Rm, and Im represent a voltage of the VCM coil (VCM voltage), a resistance of the VCM coil (VCM resistance), and current running through the VCM coil (VCM current) respectively. It is assumed that the VCM current Im is constant and invariable. The back EMF voltage detection circuit 221 can detect β by detecting Vm and Im directly or indirectly.

The operational amplifier OP1 and the resistors Rm, Rs, R1, and R2 constitute a bridge circuit in their entirety and the resistance R1 and R2 determine the gain at the first stage of amplifier. Specifically, the R1/R2 is the gain of the first stage of amplifier. When this bridge circuit is balanced, the output is equal to the VCM voltage Vm. When the bridge circuit is balanced, the following equation is satisfied:

$$R2/R1 = Rm/Rs. \quad (2)$$

The operational amplifier OP2 and the resistors R3$a$-R4$b$ are a differential amplifier for outputting the output of the operational amplifier OP1 as a back EMF voltage (or multiplied back EMF voltage by a predetermined number). The resistances R3 and R4 determine the gain of the output stage of the amplifier. Specifically, R3/R4 corresponds to the gain of the output stage of amplifier. The output Vout of the operational amplifier OP2 is given by the following formula:

$$R4/R3 \times (Im \times Rs \times R2/R1 - Vm) + Vref. \quad (3)$$

The output Vout of this operational amplifier OP2 and the back EMF voltage of the VCM 15 has a proportional relationship.

Here, in order to establish the relationship of the formula (3), it is necessary that the bridge circuit is balanced, that is, the relationship of the formula (2) is satisfied. If this relationship is not satisfied, an error occurs between the output Vout of the operational amplifier OP2 and the back EMF voltage β of the VCM 15, and as a result, the output value (detected value) of the back EMF voltage detection circuit 221 does not reflect the actual back EMF voltage. The VCM resistance Rm varies according to temperatures. Therefore, if the resistances of the resistors R2 and R1 are constant, the formula (2) becomes unsatisfied due to the temperature changes. Therefore, the back EMF voltage detection circuit 221 calibrates the resistance R2 of the resistor R2 to compensate the variation of the VCM resistance Rm. However, since the resistance R2 is a digital value, the formula (2) sometimes is not satisfied. Also, operational errors of hardware in the back EMF voltage detection circuit occur.

FIG. 10 is a graph schematically showing the relationship between the A/D conversion value AD of the detected value of the back EMF voltage detection circuit 221 and the VCM current value Im (digital value) supplied to the VCM by a command of the controller in a state that the VCM has stopped. Since the VCM has stopped, the detected value AD normally should be 0 regardless of the value of the VCM current Im. However, the detected value AD varies according to the VCM current Im due to the above-described detection errors of the back EMF voltage detection circuit 221. Specifically, the detected value AD is represented by a linear function with the gradient α representing the varying rate of the detected value AD and the offset v0 of when the VCM current Im is 0.

Thus, the detected value of the back EMF voltage detection circuit 221 contains errors variable according to the VCM current. Therefore, the controller performs a correction operation of the detected value to compensate the errors to control the VCM using the result of the correction operation. To carry out the correction operation, the controller is required to obtain a correct value of the gradient α. The velocity control by a correction process using an incorrect α may cause an oscillation of the actuator. However, as understood from the above explanation, this gradient α varies depending on temperatures and operational conditions of the HDD. Therefore, the controller conducts a calibration to obtain a more correct value of the gradient α as disclosed in Japanese Patent Publication No. 2005-174539 ("Patent Document 1").

The calibration of the gradient α is carried out before the head slider moves from a retract position to above the magnetic disk or before the head slider moves from above the magnetic disk to the retract position. The gradient α can be identified by the calibration with applying different current to the VCM in a state that the actuator has stopped and obtaining the back EMF voltage at that time. For example, in a state that the actuator is being pushed against a crash stop at the inner peripheral side or the outer peripheral side, two different VCM current values are applied to the VCM 15. The gradient α can be identified from the relationship between the respective current values and the detected values thereto.

However, if the head slider is positioned above the magnetic disk, a loud noise arises when the actuator is pushed against a crash stop. Or, performance degradation is supposed to occur due to the process time to push the actuator against the crash stop. The Patent Document 1 discloses a calibration by performing seek of the actuator between the two stop positions, i.e., a present position and a target position. This enables to conduct the calibration without pushing the actuator against the crash stop.

However, servo control utilizing servo data read by the head slider is required for performing the seek. The calibration of the gradient α is a calibration for the VCM control utilizing a VCM back EMF voltage so that the calibration without the servo control is preferred. Besides, when the servo control is unstable, noises by the VCM current for the servo control increase. Therefore, calibration without servo control is preferred for an accurate calibration. In another aspect, it is preferred that the calibration is preformed to control the VCM accurately using the back EMF voltage even when the servo control cannot be preformed.

BRIEF SUMMARY OF THE INVENTION

Embodiments in accordance with the present invention help to prevent destabilization in VCM velocity control. According to the embodiment of FIG. 2, an HDC/MPU 23 calibrates a correction operational coefficient of a detected back EMF voltage before unloading. The calibration is carried out in a state that an actuator 16 is pivoting. The HDC/MPU 23 calibrates the correction coefficient according to a motion equation of the actuator 16 using VCM current applied to a VCM 15 and a detected value of a back EMF voltage detection circuit 221.

BRIEF DESCRIPTION OF THE DRAWINGS

FIG. 5 is a diagram schematically showing another example of the relationship between the VCM current and the back EMF voltage at the calibration according to the present embodiment.

DETAILED DESCRIPTION OF THE INVENTION

Figure 1:
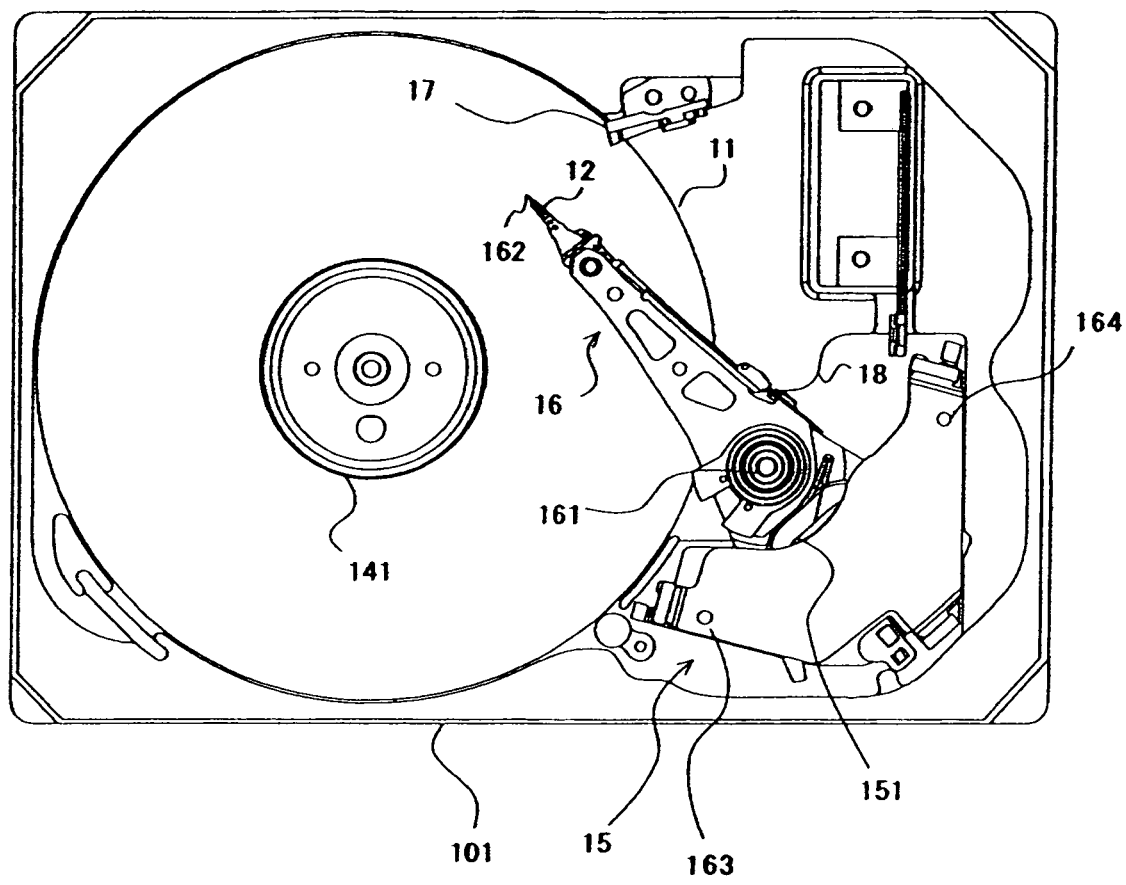
FIG. 1 is a plan view schematically showing the mechanical entire configuration of the HDD according to the present embodiment.

Embodiments in accordance with the present invention relate to a disk drive device and a calibration method therefor, in particular to calibration for velocity control of a voice coil motor.

An aspect of embodiments of the present invention is a disk drive device including a head for accessing a disk for storing data, an actuator for supporting the head and driven by a voice coil motor, a detection circuit for detecting a back EMF voltage of the voice coil motor, and a controller for correcting a detected value by the detection circuit using a correction operational coefficient and controlling a velocity of the actuator using the corrected value. The controller carries out a calibration of the correction operational coefficient based on a plurality of different VCM current values of the voice coil motor in a state that the actuator is driven by the voice coil motor and pivoting independently of servo control and the detected values by the detection circuit corresponding to the respective VCM current values. This enables calibration of the correction operational coefficient without fixing the actuator. Here, in measuring the VCM current values and the outputs of the detection circuit, it is preferred that the actuator pivots so as to oscillate. This improves safety in moving of the head.

In the calibration of the correction operational coefficient, it is preferable that a rising edge and a falling edge of a varying waveform of the VCM current are inclined. This realizes low-noise in the actuator. The controller may also carry out a calibration of the correction operational coefficient based on a difference between different VCM current values, and average the correction coefficients using a plurality of differences of the detection circuit in the calibration. This reduces the influence of noise.

The controller calculates the correction coefficient for satisfying a motion equation of the actuator based on the difference between the plurality of different VCM current values and the difference between the detected values of the detection circuit corresponding to each of the plurality of VCM current values in the calibration. Further, the correction operational coefficient corresponds to a gradient of output offsets of the detection circuit to VCM current values. Moreover, in the calibration, the controller may average the correction coefficients using the plurality of differences of the measured VCM current values and the plurality of differences between the outputs of the detection circuit, and that a sum of respective inverse numbers of the plurality of differences of the VCM current values is 0. This results in the correction operation in a more accurate and simpler form.

Another aspect of embodiments of the present invention is a disk drive device including a head for accessing a disk for storing data, an actuator for supporting the head and driven by a voice coil motor, a detection circuit for detecting a back EMF voltage of the voice coil motor, and a controller for correcting a detected value by the detection circuit using a correction operational coefficient and controlling a velocity of the actuator using the corrected value. The controller carries out a calibration of the correction operational coefficient based on a difference between a plurality of different VCM current values of the voice coil motor in a state that the actuator is driven by the voice coil motor and pivoting and a difference between detected values of the detection circuit corresponding to each of the plurality of VCM current values. This enables calibration of the correction operational coefficient without fixing the actuator independently of the servo control.

In the calibration, the controller may average the correction coefficients using a plurality of differences between the measured VCM current values and a plurality of differences between the outputs of the detection circuit. Further, the correction operational coefficient corresponds to a gradient of output offsets of the detection circuit to VCM current values which satisfies a motion equation of the actuator, and a sum of respective inverse numbers of the plurality of differences between the VCM current values is 0. This results in the correction operation in a more accurate and simpler form.

Yet another aspect of embodiments of the present invention is a calibration method for velocity control of an actuator in a disk drive device including an actuator for supporting a head and a voice coil motor for driving the actuator. This method drives the voice coil motor with respect to a plurality of different VCM current values, detects respective back EMF voltages at the plurality of different VCM current values in a state that the actuator is pivoting independently of servo control and calibrates a correction operational coefficient to the back EMF voltage detected in the velocity control based on the plurality of VCM current values and the detected back EMF voltages. This enables calibration of the correction operational coefficient without fixing the actuator.

Embodiments of the present invention achieve suppression of instability of the VCM velocity control system.

Hereinafter, a preferred embodiment to which the present invention is applicable is described. For clearness of explanation, the following description and the accompanying drawings contain omissions and simplifications as appropriate. Throughout the drawings, the same components are denoted by like reference numerals, and their repetitive description is omitted if not necessary for the sake of clearness of the explanation. Hereinbelow, embodiments of the present invention are described, by way of example of a hard disk drive (HDD) which is an example of disk drive devices.

A feature of the present embodiment is velocity feed back control of a VCM which drives an actuator. The HDD includes a detection circuit for detecting a back EMF voltage of the VCM and a controller. The controller performs a correction operation process to the detected back EMF voltage and carries out the velocity feed back control of the VCM using the result of the operation. The controller calibrates a correction operational coefficient before starting the VCM velocity control. The HDD of the present embodiment detects the back EMF voltages of the VCM at different current values in a state that the actuator is pivoting and calibrates a correction operational coefficient using the detected value. First, the entire configuration of the HDD is outlined. FIG. 1 is a diagram showing a schematic configuration of the HDD 1 according to the present embodiment. FIG. 1 shows a state of the HDD 1 in which a head slider 12 is flying over a magnetic disk 11.

In FIG. 1, the magnetic disk 11, which is an example of disks for storing data, is a non-volatile disk for recording data with a magnetized magnetic layer. A base 101 houses each component of the HDD 1. The magnetic disk 11 is fixed to a spindle motor (SPM) (not shown) by a clamp 141. The SPM rotates the magnetic disk 11 at a predetermined angular rate. A slider 12 accesses a recording region of the magnetic disk 11. The head slider 12 as an example of heads includes a head element portion and a slider to which the head element portion is fixed. The head element portion contains a read element for reading data from the magnetic disk 11 and/or a write element for recording data to the magnetic disk 11. One magnetic disk 11 is enough and a recording surface can be formed on one surface or both surfaces of the magnetic disk 11.

An actuator 16 supports and moves the head slider 12. The actuator 16 is supported by a pivotal axis 161 pivotably and pivots around the pivotal axis 161 along the radial direction of the magnetic disk 11 by the driving force of a voice coil motor (VCM) 15 as a driving mechanism to move the head slider 12 to a desired position. The VCM 15 includes a voice coil 151 fixed to the actuator 16. The VCM 15 is constituted by the voice coil 151 and two magnets (not shown) sandwiching the voice coil 151 in the pivotal axis direction.

The HDD 1 of FIG. 1 is an HDD employing a ramp load/unload scheme and has a ramp 17 for retracting the head slider 12 from above the surface of the magnetic disk 11. The ramp 17 is provided close to the outer peripheral end of the magnetic disk 11. The head slider 12 flies over the magnetic disk 11. When the magnetic disk 11 has stopped, or for power saving, the actuator 16 unloads the head slider 12 from the surface of the magnetic disk 11 and retracts the head slider 12 to the ramp 17.

In unloading, the actuator 16 pivots toward the ramp 17. A tab 162 rides on a sliding surface of the ramp 17 and slides to move on the sliding surface of the ramp 17 in the direction apart from the magnetic disk 11 (unloading direction). When the tab 162 reaches a parking position (retract position) on the parking surface of the ramp 17, the actuator 16 is latched. During non-operation, the actuator 16 is parked on the parking position on the ramp 17.

In loading, the actuator 16 moves in the opposite way. The unloading and loading are carried out by the velocity feed back control of the VCM 15. This point is described later in detail. Embodiments of the present invention may be applied to the HDD employing a contact start stop (CSS) scheme. In the case of the CSS type of HDD, the retract position (parking position) is located at the inner side region of the magnetic disk 11. In the present specification, moving the head slider to above the magnetic disk 11 is called as loading, moving it to the retract positioning as unloading.

The HDD 1 further has an outer crash stop 163 and an inner crash stop 164 for restricting the pivot range of the actuator 16. The outer crash stop 163 restricts the pivot range of the actuator 16 in the unloading direction and prevents the actuator 16 from departing from the ramp 17 toward the outer peripheral direction. The inner crash stop 164 restricts the pivot range of the actuator 16 in the loading direction and prevents the actuator 16 from crashing against the clamp 141 at the inner peripheral side.

Figure 2:
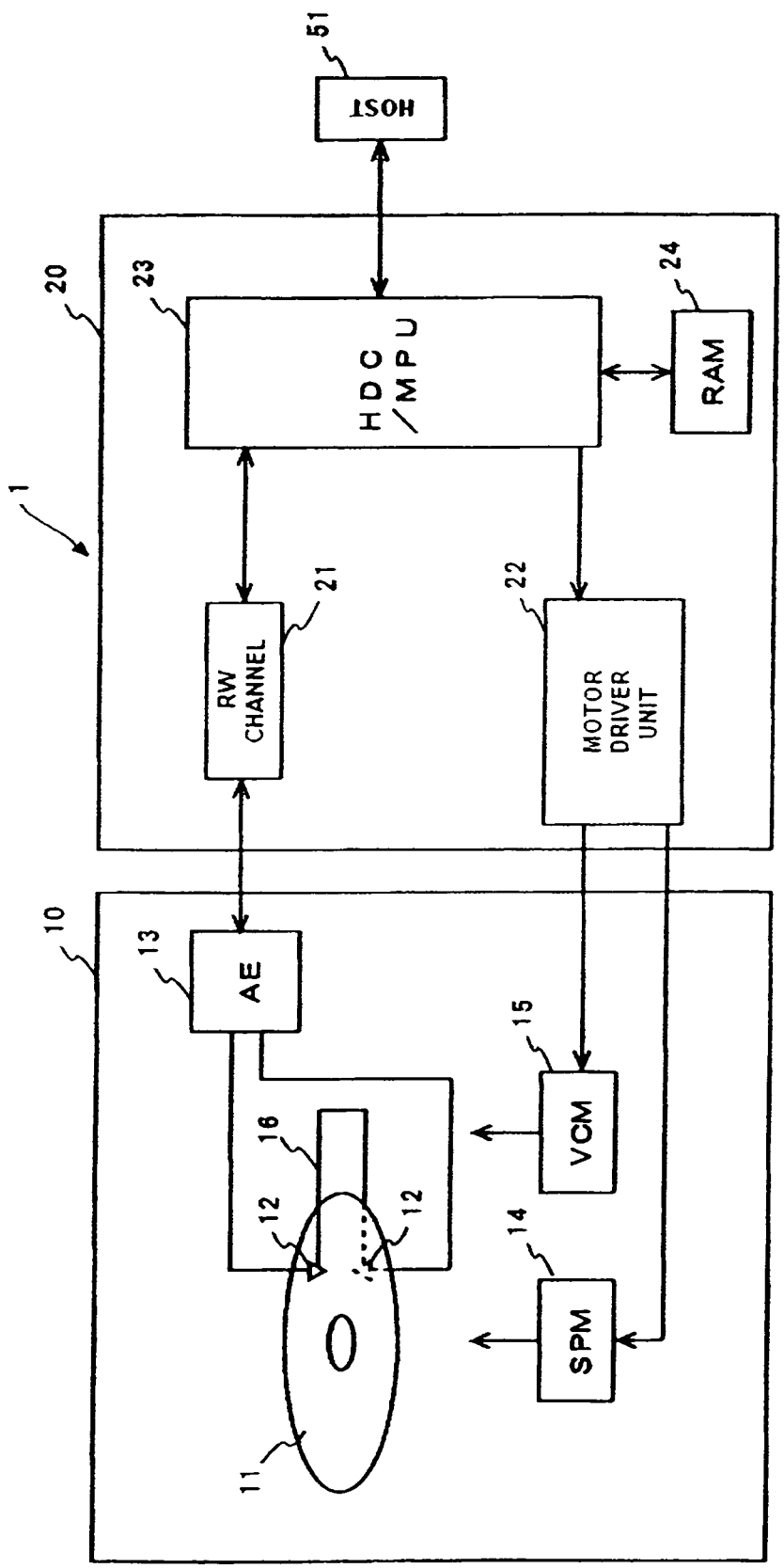
FIG. 2 is a block diagram schematically showing the functional entire configuration of the HDD according to the present embodiment.

Now referring to FIG. 2, an entire configuration of control of the HDD 1 is outlined. As shown in FIG. 2, the HDD 1 includes a circuit board 20 fixed outside an enclosure 10. On the circuit board 20, ICs such as a read/write channel (RW channel) 21, a motor driver unit 22, an integrated circuit of a hard disk controller (HDC) and an MPU (hereafter referred to as HDC/MPU) 23, a RAM 24, and a ROM (not shown) are provided. The respective circuit constructions can be implemented in one or more of ICs.

According to control data from the HDC/MPU 23 as an example of the controllers, the motor driver unit 22 drives the SPM 14. The motor driver unit 22 detects the VCM back EMF voltage (VCM velocity) for controlling the velocity of the VCM 15. The motor driver unit 22 drives the VCM 15 in accordance to the control data from the HDC/MPU 23 (referred to as DACOUT). An arm electronics (AE) 13 amplifies a reproduction signal reproduced by the head slider 12 and send it to the RW channel 21. Also, it sends a recording signal from the RW channel 21 to the selected head slider 12. The RW channel 21 performs predetermined signal processes with reading and writing processes between the AE 13 and the HDC/MPU 23.

With regard to the HDC/MPU 23, the MPU operates in accordance with micro codes loaded in the RAM 24. Starting up of the HDD 1, data required for controlling and data processing as well as micro codes working on the MPU are loaded from the magnetic disk 11 or a ROM. The HDC/MPU 23 carries out entire control of the HDD 1 in addition to necessary processes concerning data process, such as reading/writing processing control, order management of command execution, positioning control (servo control) of the head 12 utilizing a servo signal, interface control, and defect management.

Figure 3:
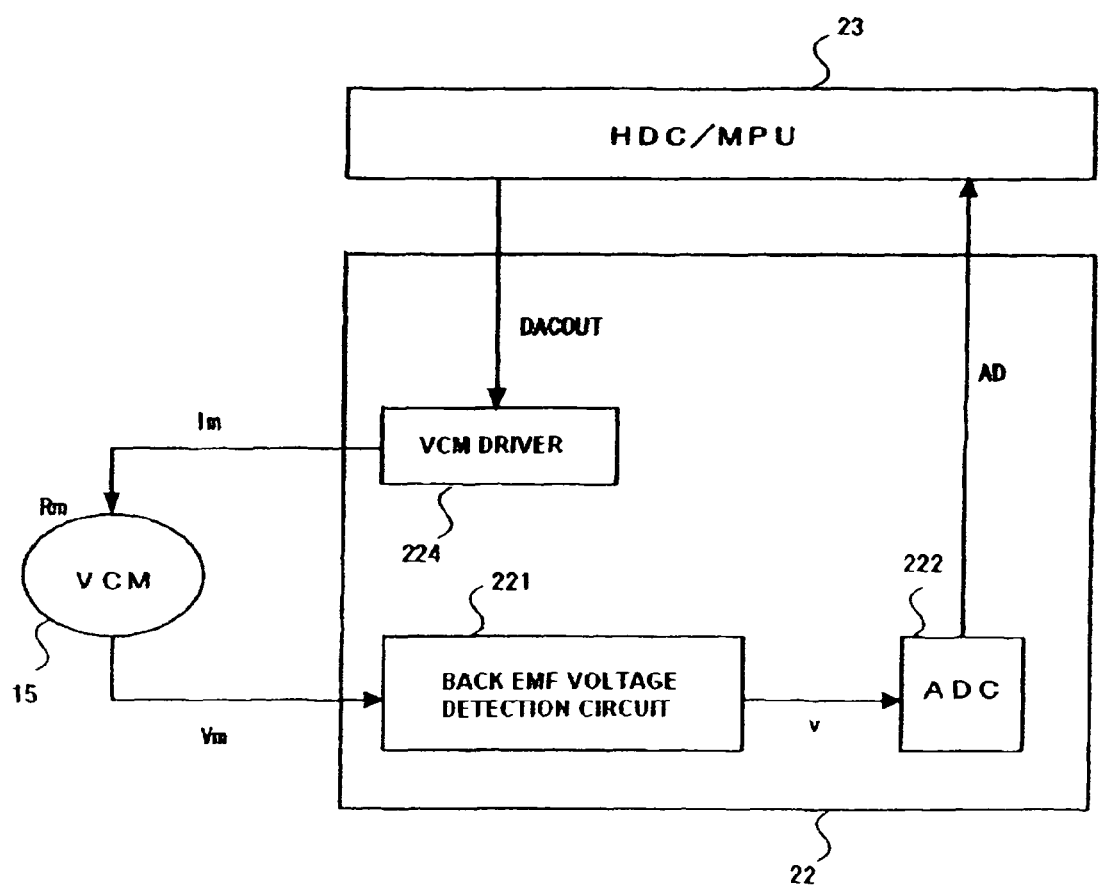
FIG. 3 is a block diagram schematically showing the functional configuration related to the VCM velocity control according to the present embodiment.
Figure 9:
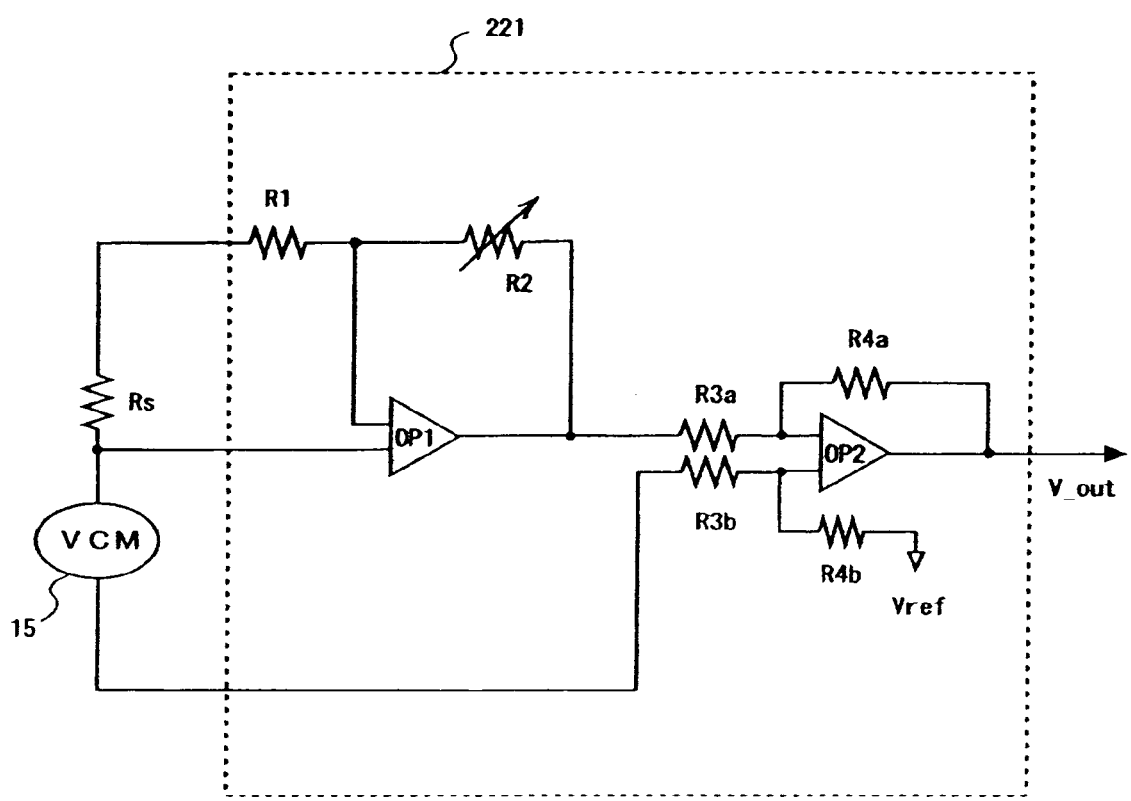
FIG. 9 is a circuit diagram schematically showing the circuit configuration of the back EMF voltage detection circuit according to a conventional technique.

In the loading/unloading process, the HDC/MPU 23 controls the VCM 15 by means of the velocity feed back control. As shown in FIG. 3, the motor driver unit 22 contains a back EMF voltage detection circuit 221 for detecting the back EMF voltage of the VCM 15. The back EMF voltage detection circuit 221 detects the back EMF voltage from the voltage Vm of the VCM 15 and outputs it. Specifically, the back EMF voltage detection circuit 221 detects and outputs the value expressed by a linear function of the back EMF voltage to detect and output the back EMF voltage. The back EMF voltage detection circuit 221 may have a same circuit construction as the one shown in FIG. 9.

The output v from the back EMF voltage detection circuit 221 is A/D converted by an A/D converter (ADC) 222 and the data AD representing the detected back EMF voltage is transferred to the HDC/MPU 23, and the HDC/MPU 23 obtains the back EMF voltage of the VCM. The sending/receiving of data between the motor driver unit 22 and the HDC/MPU 23 are performed by storing the data in a register set in the motor driver unit 22.

The HDC/MPU 23 obtains the present back EMF voltage value AD from the motor driver unit 22 and determines the VCM current value Im so that the VCM velocity gets closer to a target value using this value and the target value. The HDC/MPU 23 outputs data DACOUT representing the determined VCM current value Im to the motor driver unit 22. A VCM driver 224 of the motor driver unit 22 supplies the VCM current Im to the VCM 15 according to the control data DACOUT from the HDC/MPU 23.

As explained above with reference to FIGS. 9 and 10, the back EMF voltage AD obtained from the motor driver unit 22 has an offset proportional to the VCM current. Therefore, the HDC/MPU 23 performs a correction operation to the back EMF voltage value AD obtained from the motor driver unit 22 to determine the VCM current value Im from the result of the operation and the target value. A coefficient in this correction operation varies according to temperature conditions and the like. Therefore, the HDC/MPU 23 calibrates the correction operational coefficient before loading and/or unloading. Hereinbelow, the calibration before unloading is explained. The following calibration of the correction operational coefficient is to determine the gradient α described with referring to FIG. 10.

The HDD 1 according to the present embodiment measures the back EMF voltages of the VCM while the actuator 16 is pivoting and calibrates the correction operational coefficient using the measured values. The pivot of the actuator 16 in this calibration does not depend on the servo control but the HDD 1 supplies predetermined VCM current for the calibration to the VCM 15. Specifically, the HDD 1 supplies different VCM current to the VCM 15 to pivot the actuator 16, obtains the back EMF voltages corresponding to the respective VCM current, and determines the correction operational coefficient from these values. This calibration follows a motion equation of the actuator 16 because the actuator 16 is pivoting.

The angular motion of the actuator 16 satisfies the following equation;

$$J(d\omega/dt) = K_t \times i + Fb \quad (4)$$

wherein $J$, $\omega$, $K_t$, $i$, and $Fb$ represent the inertia, the angular rate, the torque constant, the current supplied to the VCM 15, the bias force by the elastic force of a flexible cable 18, the force generated at an air bearing between the disk and the slider, and the like, respectively.

The following formula is established, as expressed by a difference formulation using the angular rate at the time k and the current represented by $\omega_k$ and $i_k$, respectively:

$$J(\omega_k - \omega_k-1)/\Delta t = K_t \times i_k + Fb \quad (5)$$

wherein $\Delta t$ represents the duration from time (k−1) to time k. Here, if $$\Delta\omega_k = (\omega_k - \omega_k-1) \quad (6)$$

is satisfied, $$\Delta\omega_k = \Delta t(K_t \times i_k + Fb)/J \quad (7)$$

is established.

Figure 10:
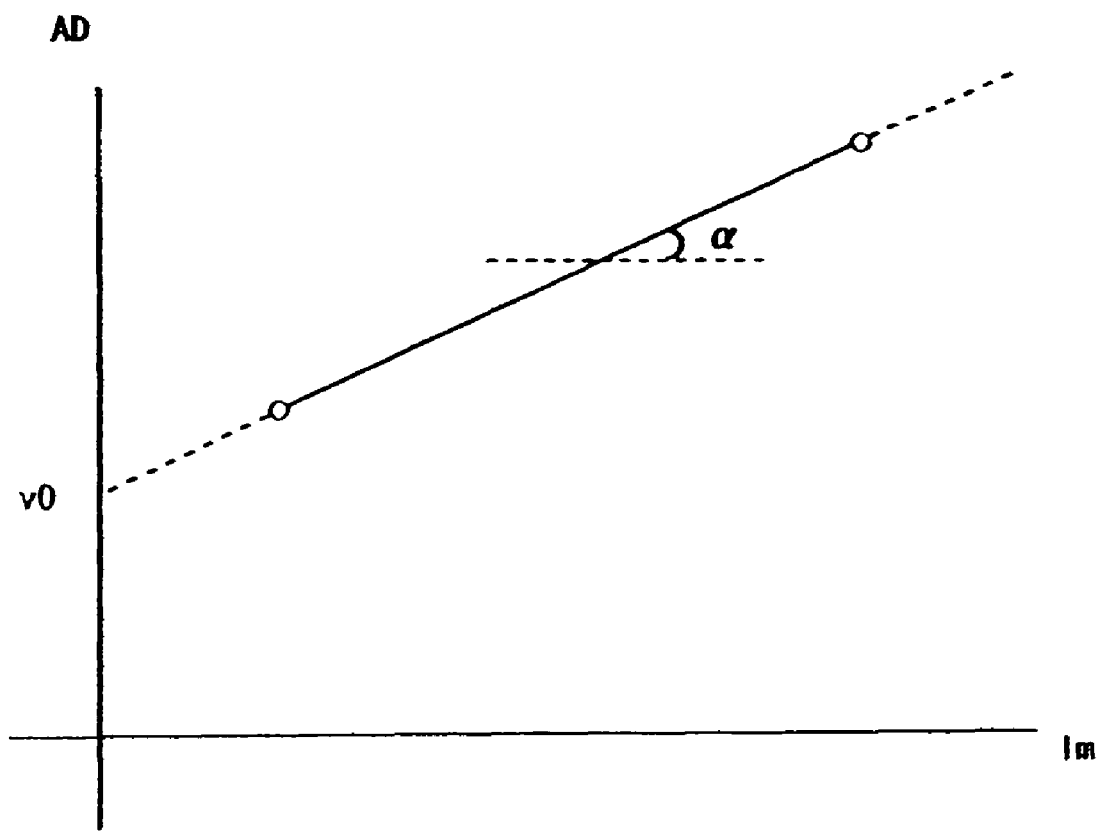
FIG. 10 is a graph schematically showing the relationship between the detected value of the back EMF voltage detection circuit and the current applied to the VCM in a state that the actuator 16 is not pivoting according to a conventional technique.

On the other hand, as explained with reference to the drawings, an offset proportional to the VCM current arises in the output v from the back EMF voltage detection circuit 221. The output v from the back EMF voltage detection circuit 221 is expressed by the following formula:

$$v = G_2\{(R_s \times G_1 - R_m) \times i + \beta\} + v_0 \quad (8)$$

wherein $G_2$, $R_s$, $G_1$, $R_m$, $\beta$, and $v_0$ represent the gain of the output stage of amplifier, the resistance of the sense resistor, the gain (correction gain) of the first stage of the amplifier, the resistance of the VCM coil 115, the back EMF voltage, and the offset of the back EMF voltage detection circuit 221 itself which corresponds to v0 in FIG. 10, respectively.

The $R_m$ and $v_0$ are considered to be constant in the calibration and the unloading. Therefore, the value $AD_k$ which is the value into which the A/D converter 222 converted the output of the back EMF voltage detection circuit 221 at time k is expressed as follows:

$$AD_k = [G_2\{(R_s \times G_1 - Rm) \times i_k + \beta_k\} + v_0] \times G_{ADC} \quad (9)$$

wherein $G_{ADC}$ represents the gain of the ADC 222.

Considering the difference $\Delta AD_k$ between the A/D converted values at the time k and the time (k−1), there is no influence by the offset $v_0$, and the following formula is established:

$$\Delta AD_k = G_2\{(R_s \times G_1 - R_m) \times \Delta i_k + \Delta \beta_k\} \times G_{ADC}. \quad (10)$$

Here, the back EMF voltage $\beta$ is proportional to the torque constant Kt and the angular rate $\omega$ and is expressed as:

$$\beta = K_t \times \omega. \quad (11)$$

Substituting the formula (11) to the formula (10), the following formula is obtained:

$$\Delta AD_k = G_2 \times \{(R_s \times G_1 \times R_m) \times \Delta i_k + K_t \times (\Delta t/J) \times (K_t \times i_k + Fb)\} \times G_{ADC} \quad (12)$$

Here, when the gain in converting the current value I indicated by DACOUT which is a command from the HDC/MPU 23 to the motor driver unit 22 to the current i which is actually supplied to the VCM 15 is denoted by $G_{DAC}$, the following formula is established:

$$i_k = G_{DAC} \times I_k. \quad (13)$$

Substituting the formula (13) to the formula (12), the following formula is obtained:

$$\Delta AD_k = G_2 \times G_{ADC} \times G_{DAC} \times (R_s \times G_1 - R_m) \times \Delta i_k + G_2 \times G_{ADC} \times G_{DAC} \times (\Delta t/J) \times K_t^2 \times I_k + G_2 \times G_{ADC} \times G_{DAC} \times (\Delta t/J) \times K_t \times Fb \quad (14)$$

Wherein, the coefficients in the formula (14) are expressed as:

$$\alpha = G_2 \times G_{ADC} \times G_{DAC} \times (R_s \times G_1 - R_m), \quad (15)$$

$$G_i = G_2 \times G_{ADC} \times G_{DAC} \times (\Delta t/J) \times K_t^2, \text{ and} \quad (16)$$

$$G_1 = G_2 \times G_{ADC} \times G_{DAC} \times (\Delta t/J) \times K_t. \quad (17)$$

Then, the formula (14) can be expressed as:

$$\Delta AD_k = \alpha \times \Delta I_k + G_i \times I_k + G_f \times Fb. \quad (18)$$

This $\alpha$ is the gradient $\alpha$ explained with referring to FIG. 10 and the value to be determined by this calibration. From the formula (18), $\alpha$ is expressed by the following formula (19).

$$\alpha = \Delta AD_k/\Delta I_k - G_i \times I_k/\Delta I_k - G_f \times Fb/\Delta I_k \quad (19)$$

As understood from the formula (19), the HDC/MPU 23 supplies two or more different VCM currents to drive the VCM 15. And while the VCM is being driven, that is, in a state that the actuator 16 is pivoting, the HDC/MPU 23 obtains the A/D converted back EMF voltage detection value at the respective VCM current to determine the correction coefficient $\alpha$. As one of the simplest methods, for example, the HDC/MPU 23 provides the VCM current value $I_k$−1 to the motor driver unit 22 and obtains the A/D converted back EMF voltage detection value $AD_k$−1 while the actuator 16 is pivoting. Then, the HDC/MPU 23 provides the VCM current value $I_k$ to the motor driver unit 22 and obtains the A/D converted back EMF voltage detection value $AD_k$ while the actuator 16 is pivoting.

The duration between obtaining $AD_k$−1 and obtaining $AD_k$ is $\Delta t$, and the difference between $I_k$ and $I_k$−1 is $\Delta I_k$. Further, Kt and J have been determined at the design stage. Moreover, the coefficients $G_{ADC}$ and $G_{DAC}$ have been set at the design stage. Therefore, the HDC/MPU 23 can determine the coefficients $G_i$ and $G_f$. Typically, the bias force Fb corresponding to the head position as a value to be used for the servo control has been set and the HDC/MPU 23 can use the value. Otherwise, the HDC/MPU 23 may measure the bias force Fb by driving the VCM 15.

To conduct a more accurate calibration, it is preferable to conduct a plurality of measurements to calculate their average. Also, it is known that the registered preset bias force Fb can be inaccurate for use in the calibration and varies with increase of the operating time of the HDD 1. Therefore, it is preferred to be able to conduct the calibration without using the bias force Fb.

Hence, the VCM current $I_k$ of a constant amplitude is oscillated and the following VCM currents are given:

$$I_k = I_{cal} (k = 2m-1)$$

$$I_k = -I_{cal} (k = 2m) \quad (20)$$

The odd-numbered current value is $I_{cal}$ and the even-numbered current value is $-I_{cal}$. The absolute values of the even- and odd-numbered current values are the same and their signs are opposite each other. Taking $I_k$ like this enables $\alpha$ to be expressed by a simple formula.

First, $$\Delta I_k = I_k - I_{k-1}. \quad (21)$$

Therefore, the odd-numbered and the even-numbered $\Delta I_k$ are expressed as follows, respectively:

$$\Delta I_k = 2I_{cal} (k = 2m-1)$$

$$\Delta I_k = -2I_{cal} (k = 2m). \quad (22)$$

Then, considering the average value of $\alpha$, it is used as the correction operational coefficient decided by the calibration. The average value of $\alpha$ can be given by the following formula:

$$ave(\alpha) = (1/N) \times \Sigma(\Delta AD_k/\Delta I_k) - (1/N) \times \Sigma(G_i I_k/\Delta I_k)(1/N) \times \Sigma(G_f Fb/\Delta I_k) \quad (23)$$

wherein $\Sigma$ is a sum from k=1 to N. The $\Sigma$ in the following formulae are the same.

Here, when N is an even number, Fb can be considered constant by setting $I_{cal}$ at a small and proper value. Therefore, the following relationship is established:

$$\sum (Fb/\Delta I_k) = Fb \left\{ \begin{array}{l} (1/2I_{cal}) - (1/2I_{cal}) + \\ (1/2I_{cal}) - \ldots + (1/2I_{cal}) \end{array} \right\} = 0. \quad (24)$$

It is to say the term including Fb becomes 0.

Also, the $\Sigma(I_k/\Delta I_k)$ included in the second term satisfies the following formula:

$$\sum (I_k/\Delta I_k) = \left\{ \begin{array}{l} (I_{cal}/2I_{cal}) + (-I_{cal}/-2I_{cal}) + \\ (I_{cal}/2I_{cal}) + \ldots + (I_{cal}/2I_{cal}) \end{array} \right\} = N/2. \quad (25)$$

That is, the second term is a constant irrelevant to $I_k$.

From the above formulae (23) to (25), the average value ave($\alpha$) of $\alpha$ can be expressed by the following formula:

$$ave(\alpha) = (1/N) \times (1/2I_{cal}) \times \Sigma(-1)^{k-1} \Delta AD_k - G_i \times (1/N) \times (N/2). \quad (26)$$

As described above, setting the respective Ik for the sum of $1/\Delta I_k$ to be 0 enables to perform the calibration without using Fb. If there is no problem in using Fb, the sum of $1/\Delta I_k$ is not necessary to be 0. In this case, obtaining the average of the gradient α from a plurality of measured values reduces the influence of the noises to realize a more accurate calibration.

Although the above coefficient $G_i$ is assumed to be predetermined, the HDD 1 can determine this coefficient by measurement. For example, the HDC/MPU 23 obtains the ADs corresponding to the different current values of the VCM to determine α in a state that the actuator 16 is parked on the ramp 17. The HDC/MPU 23 can determine the coefficient Gi using the determined a from the relationship of the formula (26). This point is the same with regard to the other coefficients. Determining a by calibration in the state that the actuator 16 has stopped enables to determine the coefficients to be used in the calibration in a state that the actuator 16 is pivoting. According to the above method, the calibration can be performed by using the measured values obtained without seek or tracking by the actuator 16 by means of the servo control.

Figure 4:
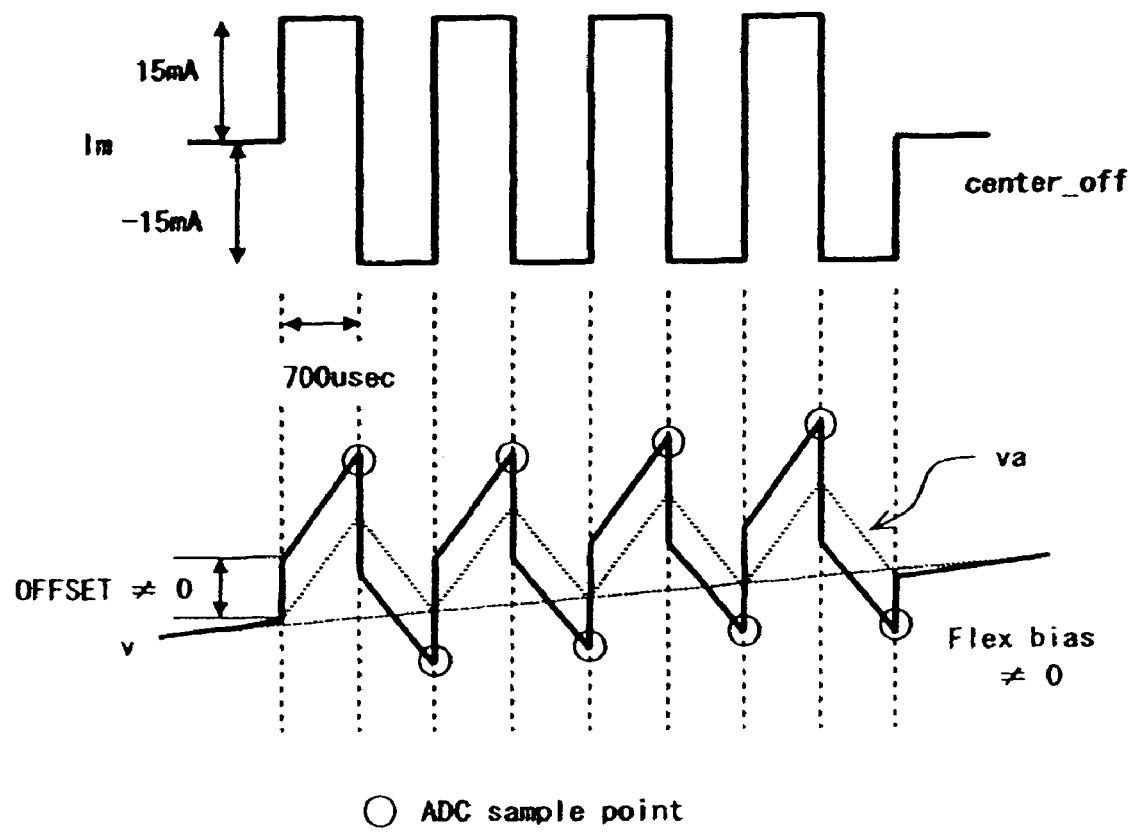
FIG. 4 is a diagram schematically showing an example of the relationships between the VCM current and the back EMF voltage at the calibration according to the present embodiment.

Here, a specific example of the above-described calibration process is described. FIG. 4 illustrates an example of the relationships between the VCM current value Im applied to the VCM 15, the corresponding detected back EMF voltage value v, and the actual back EMF voltage va (VCM velocity). The VCM current value Im oscillates between 15 mA and −15 mA. The time interval Δt is 700 μsec and is constant. The number of times of measurements N is eight and the formula (24) is satisfied. Therefore, the HDC/MPU 23 can calculate the gradient α in accordance with the formula (26) without using Fb.

In the example of FIG. 4, the actuator 16 repeats positive and negative accelerated movements alternately. Although its velocity (VCM 15 velocity) varies, the actuator 16 keeps pivoting in one direction all the time. Also, as the bias force Fb exists, the detected back EMF voltages and the base line (offset) of the actual back EMF voltages va increase with a specific gradient. The difference between the detected back EMF voltage v and the actual back EMF voltage va at each timing is the offset which the HDC/MPU 23 should correct.

Here, for the sampling points by the ADC 222, timings after a certain period of time since the VCM current values have changed are preferred to the ones immediately after the VCM current values have changed. This is because a transient response caused mainly by a VCM inductance arises in the output of the back EMF voltage detection circuit 221 in response to the variance of the VCM current value so that accurate values occasionally cannot be obtained. Therefore, it is preferred to sample after the middle point between a change timing of the VCM current value and the next change timing. In the above example, it is preferred to sample after the VCM current changes and the transient response is ended, for example, after a lapse of 350 μsec from the change of the VCM current. As in the example of FIG. 4, sampling immediately before the VCM current varies is more preferred.

The absolute values of the VCM current changing in the calibration of the gradient a may be either the same as in the example of FIG. 4 or variable. For example, the absolute values of the VCM current which oscillates between the positive and negative values may gradually increase. In such a case, it is preferred that the sum of the inverse numbers of the differences of the VCM current is 0 such that it is possible to calibrate a without using Fb. The oscillating cycle of the VCM current may not be constant, but vary.

In the example of FIG. 4, the actuator 16 keeps pivoting in the same direction during the calibration. However, it is preferable that the moving range of the head slider 12 is small at the calibration from the view point of the reliability. Therefore, the HDC/MPU 23 may supply the VCM current so that the pivoting direction of the actuator 16 may change to oscillate in the radial direction of the magnetic disk.

The VCM current waveform Im and the back EMF voltage va (VCM velocity) shown in FIG. 5 are an example in a case that the actuator 16 oscillates. In FIG. 5, the influence of the bias force is ignored. The first time period of the constant VCM current is a half of the other periods. Samplings are once at the respective constant values and are taken immediately before the current varies like in FIG. 4. The sampling periods are constant. If the first and the last time periods in which the current is constant in the example of FIG. 5 are the same as the ones of FIG. 4, the sampling period becomes twice as the example of FIG. 4 and more calibration time is required. Therefore, any type of calibration may be chosen according to the design of the respective HDDs.

Figure 6A:
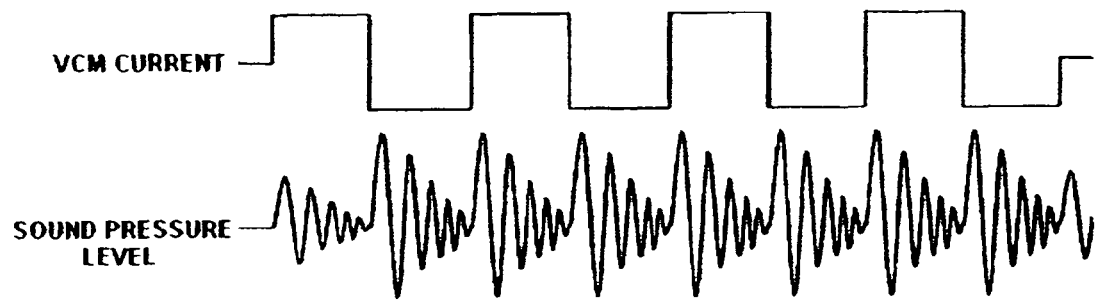
FIGS. 6(*a*) and 6(*b*) are diagrams schematically showing an example of the relationship between the VCM current and the generated sound pressure level according to the present embodiment.
Figure 6B:
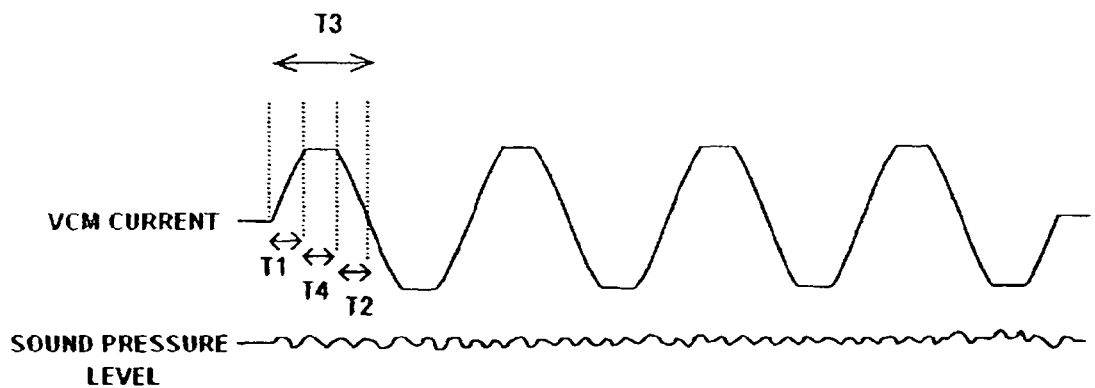

The above-described calibration can make a harsh sound because the VCM current varies. It is preferred to reduce this sound for the HDD as a product. Then, it is preferred to adjust the waveform of the VCM current in the calibration. FIG. 6(b) shows an example of a preferable waveform of the VCM current. In a continuous rectangular waveform shown in FIG. 6(a), waveform changes at rising and falling edges are steep and it includes high frequencies so that it is likely that the mechanical system of the actuator 16 resonates to make a harsh sound.

On the other hand, as shown in FIG. 6(b), a low-noise waveform with smaller gradient angle at the rising and falling edges of the VCM current waveform can make a sound pressure level of the actuator 16 small. In the VCM current waveform in FIG. 6(b), periods for rising/falling from the base (center) of the waveform to the top/bottom thereof are represented by T1 and T2. A period between the two base points adjacent to each other is represented by T3 (½ cycle of the continuous waveform of FIG. 6(b)). The period with the constant current value is represented by T4. There is a concern about the influence by noise due to the waveform change when the period T4 with a constant current value is short. Therefore, the rising/falling periods T1 and T2 are set appropriately by design. Specifically, those values are lowered so that the frequency component does not include the resonance point of the mechanical system. As a preferable example, the rising/falling periods T1 and T2 are set at not more than 1/10 of T3. Here, the waveforms of the rising and falling are the same as a sign wave.

Figure 7:
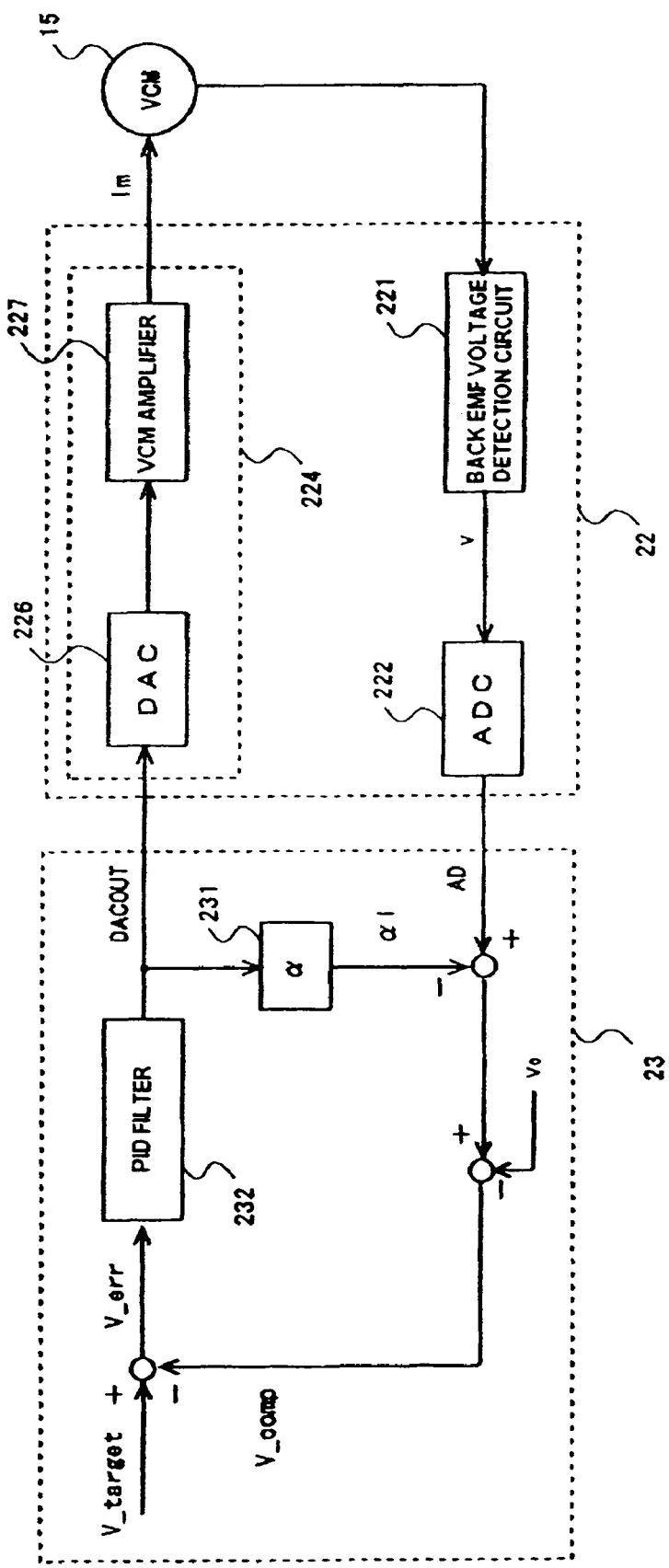
FIG. 7 is a block diagram schematically showing the VCM velocity control system according to the present embodiment.

FIG. 7 is a block diagram schematically showing the VCM velocity control system according to the present embodiment. A VCM driver 224 D/A converts the control data DCAOUT from the HDC/MPU 23 by D/A converter (DAC) 226 and a VCM amplifier 227 supplies current to the VCM 15 according to the converted value. The back EMF voltage is detection circuit 221 detects the back EMF voltage from the voltage of the VCM 15. The value v which the back EMF voltage detection circuit 221 outputted is A/D converted by the A/D converter (ADC) 222 and is transferred to the HDC/MPU 23.

The HDC/MPU 23 which obtained the VCM velocity data AD calculates the value αI by multiplying the prior VCM current value (DACOUT) by α by means of the function 231. The HDC/MPU 23 deducts αI from the back EMF voltage data AD from the back EMF voltage detection circuit 221, and further deducts the offset v0 therefrom as the correction process to the detected VCM velocity. Thereby, more accurate present back EMF voltage V_comp, the result of the correction operation, is determined.

A PID filter 232 determines the VCM current value as a control amount from the difference V_err between the V_comp in such a way that the V_comp approaches to a target value V_target, and the V_target and outputs DACOUT representing it. Thus, the correction operation process in the HDC/MPU 23 achieves a correct VCM velocity feed back control in loading/unloading.

Figure 8:
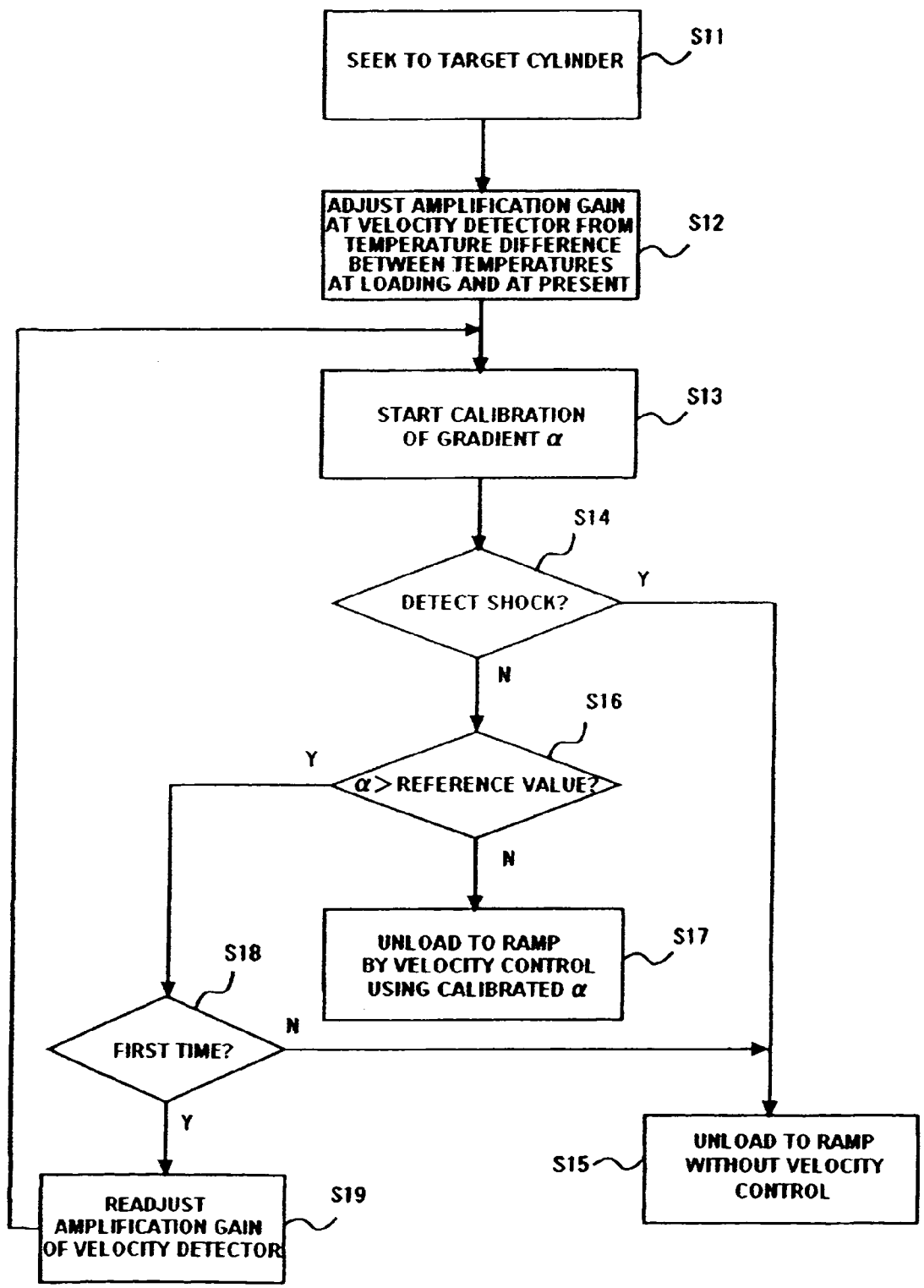
FIG. 8 is a flowchart illustrating the calibration process at unloading according to the present embodiment.

Next, the unloading process including the calibration step of the correction coefficient α according to the present embodiment is described with referring to a flowchart of FIG. 8. First, the HDC/MPU 23 moves the head slider 12 to a predetermined target cylinder for seek (S11). To shorten the unloading process time, the preferable target cylinder is a cylinder at the outer peripheral side. For example, the target cylinder may be the outermost cylinder in the data storing region or the cylinder inner than the outermost cylinder by a moving distance of the head at the calibration of α.

After the head slider 12 has moved toward the outer peripheral side for seek, the HDC/MPU 23 adjusts the amplification gain at the VCM velocity detector 221 based on the difference between the temperatures at loading and at present (S12). That is, the HDC/MPU 23 adjust the resistance R2 at the first stage of amplifier shown in FIG. 9 to decrease the gradient α. Here, the VCM velocity detector 221 itself may perform this process.

Then, the HDC/MPU 23 starts the above-described calibration process and corrects the value of the gradient α to follow the present status (S13). If it detects a shock to the actuator 16 in the calibration process (Y at S14), it is impossible to continue to calibrate. For the sake of safety as well, the HDC/MPU 23 stops the calibration process and unloads the actuator 16 to the ramp 17 without the velocity control (S15).

If the calibration of the gradient α is ended without detecting a shock to the actuator 16 at the calibration process (N at S14), the HDC/MPU 23 compares the specified α with the reference value (S16). If α does not exceed the reference value (N at S16), the HDC/MPU 23 drives the VCM 15 to unload the head slider 12 to the ramp 17 with performing the correction process of the back EMF voltage (detected VCM velocity) using the newly calculated α (S117).

If α exceeds the reference value (Y at S16), the HDC/MPU 23 determines the times of calculation of α (S18). If the calculation is the first time (Y at S18), the HDC/MPU 23 re-calculates the gradient α (S13) after it has re-adjusted the amplification gain of the VCM velocity detector 221 (S19). If the calculation is the second time or more (N at S18), the HDC/MPU 23 unloads the actuator 16 to the ramp 17 without controlling the velocity (S15).

As set forth above, the present invention is described by way of the above embodiments but is not limited to these embodiments. A person skilled in the art can easily modify, add, and convert the each element in the above embodiments within the scope of the present invention. For example, embodiments of the present invention can be applied to other types of disk drive devices than the HDD. Also, embodiments of the present invention can be utilized to loading with the CSS scheme. The calibration of the present invention is especially preferable to the above described embodiments but the present invention can be applied to systems having different circuit parameters or correction coefficients to be set.

What is claimed is:

1. A disk drive device comprising:
a head for accessing a disk for storing data;
an actuator for supporting the head and driven by a voice coil motor;
a detection circuit for detecting a back EMF voltage of the voice coil motor; and
a controller for correcting a detected value by the detection circuit using a correction operational coefficient, controlling a velocity of the actuator using the corrected value, and carrying out a calibration of the correction operational coefficient based on a plurality of different VCM current values of the voice coil motor in a state that the actuator is driven by the voice coil motor and pivoting independently of servo control and the detected values of the detection circuit corresponding to the respective VCM current values.

2. The disk drive device according to claim 1, wherein a rising edge and a falling edge of a varying waveform of the VCM current are inclined in the calibration of the correction operational coefficient.

3. The disk drive device according to claim 1, wherein the controller carries out a calibration of the correction operational coefficient based on a difference between different VCM current values and a difference between outputs of the detection circuit corresponding to the respective VCM current values, and averages the correction coefficients using a plurality of differences between the measured VCM current values and a plurality of differences between the outputs of the detection circuit in the calibration.

4. The disk drive device according to claim 1, wherein the controller calculates the correction coefficient for satisfying a motion equation of the actuator based on the difference between the plurality of different VCM current values and the difference between the detected values of the detection circuit corresponding to each of the plurality of VCM current values in the calibration.

5. The disk drive device according to claim 4, wherein the correction operational coefficient corresponds to a gradient of output offsets of the detection circuit to VCM current values.

6. The disk drive device according to claim 5, wherein, in the calibration, the controller averages the correction coefficients using the plurality of differences of the measured VCM current values and the plurality of differences between the outputs of the detection circuit, and a sum of respective inverse numbers of the plurality of differences of the VCM current values is 0.

7. The disk drive device according to claim 1, wherein the actuator pivots so as to oscillate in measuring the VCM current values and the outputs of the detection circuit.

8. A disk drive device comprising:
a head for accessing a disk for storing data;
an actuator for supporting the head and driven by a voice coil motor;
a detection circuit for detecting a back EMF voltage of the voice coil motor;
a controller for correcting a detected value by the detection circuit using a correction operational coefficient, controlling a velocity of the actuator using the corrected value, and carrying out a calibration of the correction operational coefficient based on a difference between a plurality of different VCM current values of the voice coil motor in a state that the actuator is driven by the voice coil motor and pivoting and a difference between detected values of the detection circuit corresponding to each of the plurality of VCM current values;
the controller, in the calibration, averages the correction coefficients using a plurality of differences between the measured VCM current values and a plurality of differences between the outputs of the detection circuit; and
the correction operational coefficient corresponds to a gradient of output offsets of the detection circuit to VCM current values which satisfies a motion equation of the actuator, and a sum of respective inverse numbers of the plurality of differences between the VCM current values is 0.

9. The disk drive device according to claim 8, wherein the actuator pivots so as to oscillate in measuring the VCM current values and the outputs of the detection circuit.

10. A calibration method for a velocity control of an actuator in a disk drive device comprising an actuator for supporting a head and a voice coil motor for driving the actuator, the calibration method comprising;

driving the voice coil motor with respect to a plurality of different VCM current values;

detecting respective back EMF voltages at the plurality of different VCM current values in a state that the actuator is pivoting independently of servo control; and calibrating a correction operational coefficient to the back EMF voltage detected in the velocity control based on the plurality of VCM current values and the detected back EMF voltages.

11. The method according to claim 10, wherein a rising edge and a falling edge are inclined in a waveform of the VCM current for driving the voice coil motor.

12. The method according to claim 10, wherein the calibrating calibrates the correction operational coefficient based on a difference between different VCM current values and a difference between outputs of the detection circuit corresponding to the respective VCM current values, and the correction coefficients are averaged by using a plurality of differences of the measured VCM current values and a plurality of differences of the outputs of the detection circuit.

13. The method according to claim 12, wherein the correction operational coefficient corresponds to a gradient of output offsets of the detection circuit to VCM current values which satisfies a motion equation of the actuator, and a sum of respective inverse numbers of the plurality of differences between the VCM current values is 0.

14. The method according to claim 10, wherein the actuator pivots so as to oscillate in measuring the VCM current values and the outputs of the detection circuit.

* * * * *

UNITED STATES PATENT AND TRADEMARK OFFICE
CERTIFICATE OF CORRECTION

PATENT NO. : 7,800,855 B2
APPLICATION NO. : 11/985367
DATED : September 21, 2010
INVENTOR(S) : Kenichi Kuramoto et al.

It is certified that error appears in the above-identified patent and that said Letters Patent is hereby corrected as shown below:

Column 4, Line 62, please change "VCM current VCM current values" to --VCM current values and a difference between outputs of the detection circuit corresponding to respective VCM current values--

Column 4, Line 64, please change "differences of the detection circuit" to --differences between the measured VCM current values and a plurality of differences between the outputs of the detection circuit--

Column 5, Line 42, please change "method for velocity control" to --method for a velocity control--

Column 6, Line 22, please change "A slider" to --A head slider--

Column 9, Line 34, Formula (14), please change "$(\Delta t/J) \times Kt^{\times Fb}$" to --$(\Delta t/J) \times Kt \times Fb$--

Column 9, Line 42, Formula (17), please change "$G_1 = G_2 \times G_{ADC} \times G_{DAC} \times (\Delta t/J) \times K_t$" to --$G_f = G_2 \times G_{ADC} \times G_{DAC} \times (\Delta t/J) \times K_t$--

Column 11, Line 13, please change "determined a from" to --determined α from--

Column 11, Line 15, please change "Determining a by" to --Determining α by--

Column 11, Line 58, please change "gradient a may" to --gradient α may--

Column 11, Line 64, please change "calibrate a without" to --calibrate α without--

Signed and Sealed this

Twenty-first Day of December, 2010

David J. Kappos
*Director of the United States Patent and Trademark Office*